UNITED STATES PATENT OFFICE.

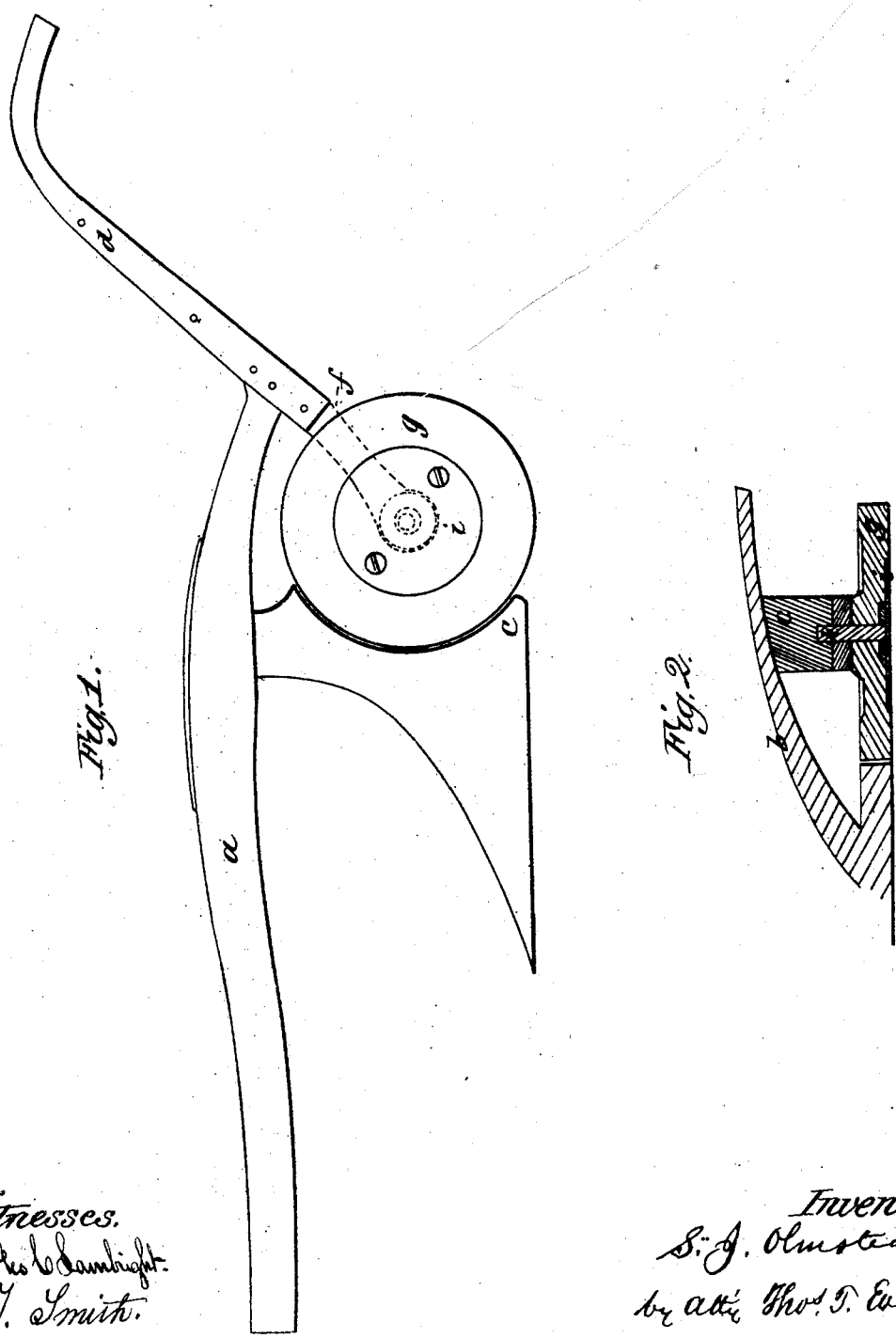

SAMUEL J. OLMSTED, OF BINGHAMTON, NEW YORK, ASSIGNOR TO HIMSELF, WARING S. WEED, AND D. S. AYRES, OF SAME PLACE.

IMPROVEMENT IN PLOWS.

Specification forming part of Letters Patent No. 37,939, dated March 17, 1863.

*To all whom it may concern:*

Be it known that I, SAMUEL J. OLMSTED, of Binghamton, in the county of Broome and State of New York, have invented a certain new and useful Improvement on Plows; and I do hereby declare that the following is a full, clear, and exact description thereof, reference being had to the accompanying drawings, and to the marks and letters thereon.

By the drawings forming part of this specification are shown a plow, or so much thereof as may be necessary, with my improvement attached thereto, Figure 1 of these drawings representing a side view of a plow on the land side, and Fig. 2 being a view of a part of a plow below a horizontal line drawn through the center of an arm projecting from the inner surface of the mold-board.

In each of these figures, where like parts are shown, like parts and letters are used to indicate the parts.

The beam of the plow is marked $a$, the mold-board $b$, the landside $c$, and the handles $d$.

It will be perceived that an arm $e$, projects from the inner surface of the mold-board, and that another arm, $f$, passes from the landside-handle down to the arm $e$. This arm $e$ will form part of the mold-board casting. It gives support to a wheel, $g$, which is shown attached to it by a screw, $h$, the head of the screw being covered by a plate, $i$, countersunk in the outer surface of the wheel, so that the entire outer surface of the wheel is smooth and even. The wheel $g$ forms a large part—nearly the whole—of the landside of the plow. It projects a short distance below the bottom of the landside and share, and thus is not subject to the friction that is usual to a fixed or rigid landside, either on its side or bottom. This wheel-landside is what constitutes my improvement; and What I therefore claim as my invention, and desire to secure by Letters Patent, is—

1. The attachment of a wheel upon the landside, forming a large part thereof and projecting below the bottom of the plow, while its exterior or outer surface is in line with the landside, for the purpose of removing the friction of the plow while at work, as set forth.

2. Making the supporting-arm $e$ of the wheel a part of the mold-board casting.

This specification signed this 22d day of November, 1862.

S. J. OLMSTED.

Witnesses:
 A. B. STEVENS,
 D. L. BROWNSON.